Oct. 31, 1950 S. V. LANDGRAF 2,528,152
METHOD AND APPARATUS FOR PRODUCING
RESIN IMPREGNATED SHEETS
Filed June 24, 1947 2 Sheets-Sheet 1
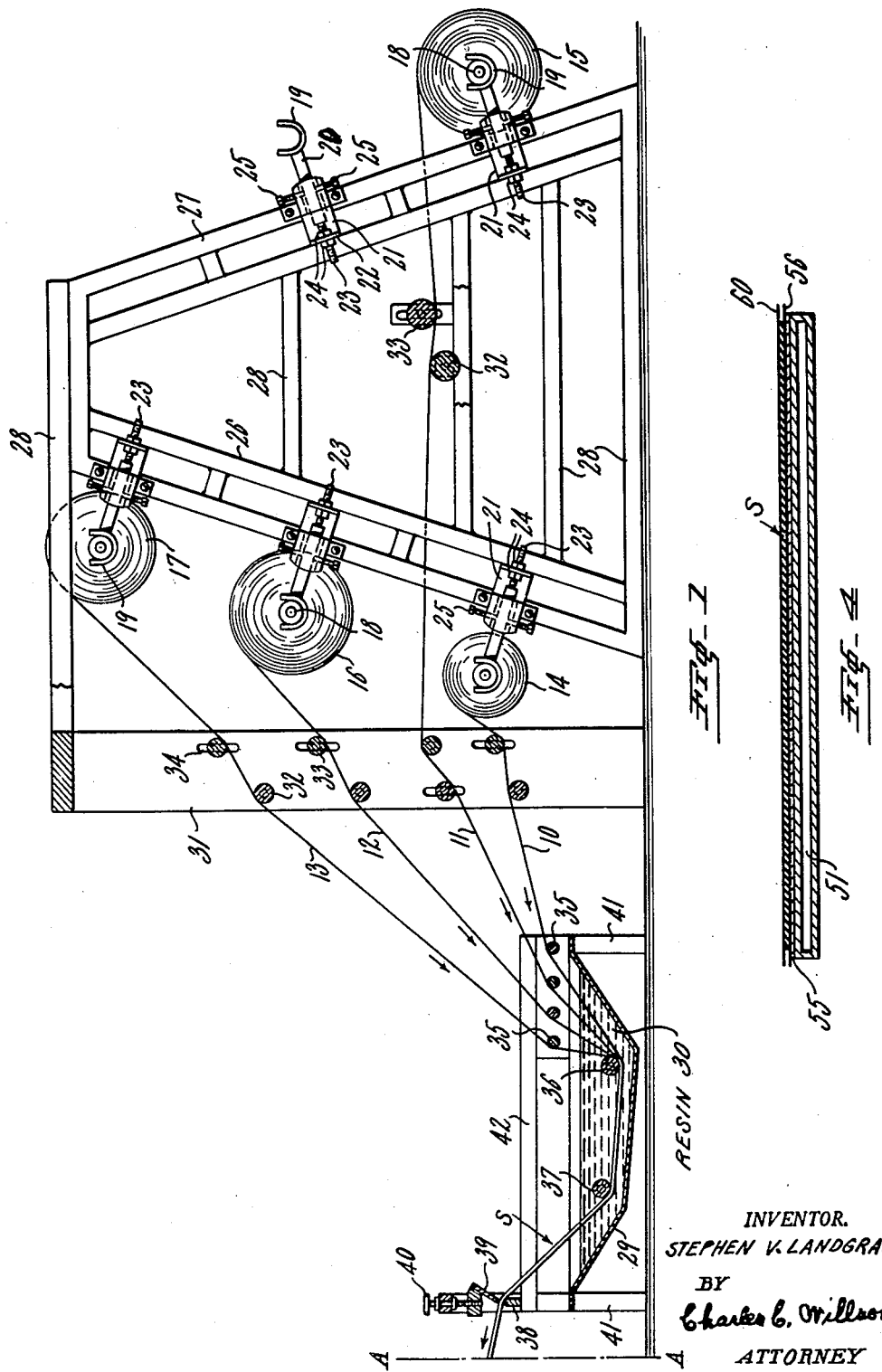
INVENTOR.
STEPHEN V. LANDGRAF
BY
Charles C. Willson
ATTORNEY

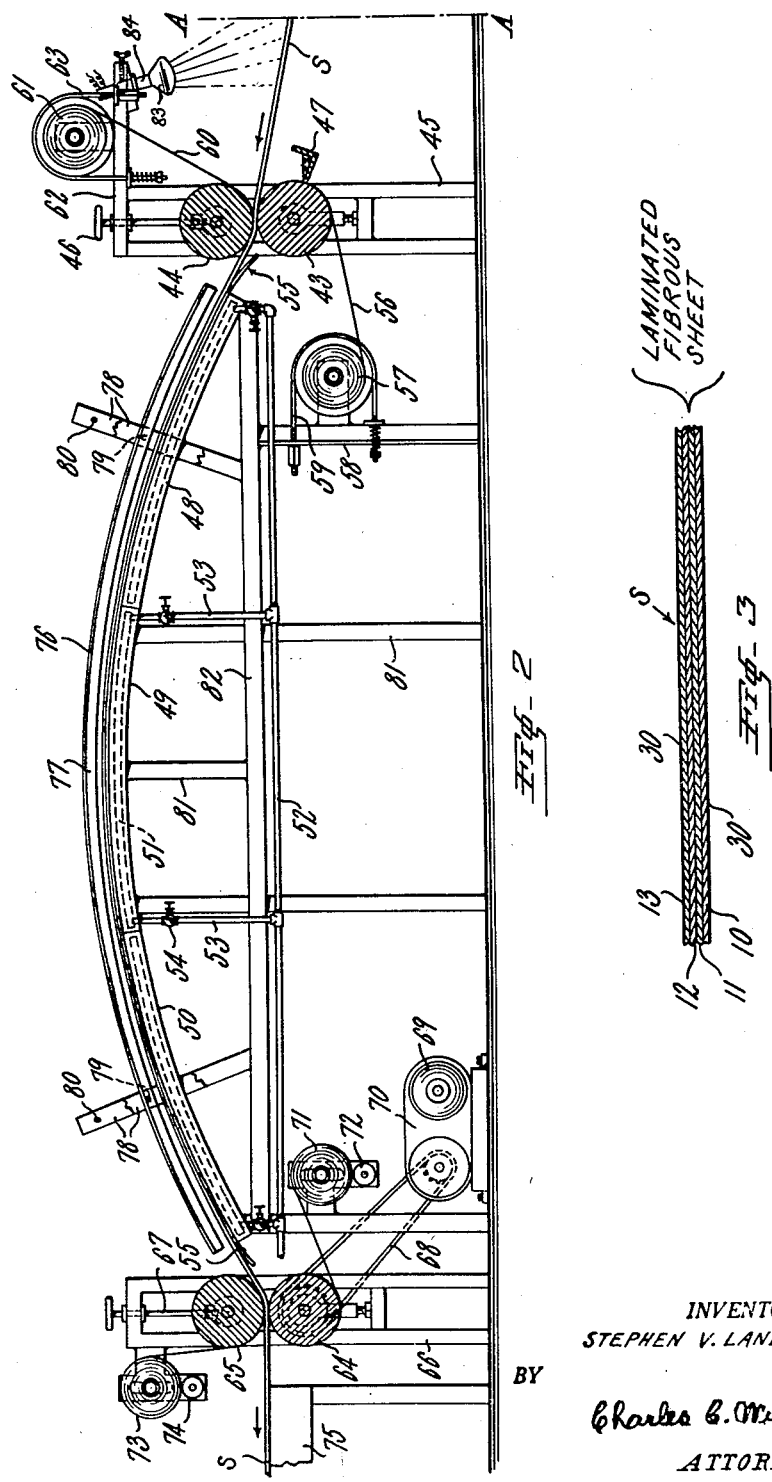

Patented Oct. 31, 1950

2,528,152

UNITED STATES PATENT OFFICE 2,528,152

METHOD AND APPARATUS FOR PRODUCING RESIN IMPREGNATED SHEETS

Stephen V. Landgraf, Elkhart, Ind., assignor to United States Rubber Company, New York, N. Y., a corporation of New Jersey Application June 24, 1947, Serial No. 756,755

8 Claims. (Cl. 154—37)

This invention relates to a method and apparatus for producing resin-impregnated sheet material having a hard mar-resistant outer surface, and more particularly to the manufacture of such material as a continuous operation.

The present invention may be employed to treat a single sheet of fibrous material to impart thereto a hard, durable, mar-resistant surface, or two or more sheets may be impregnated with the resin and then brought together so that the resin when cured will bond the sheets together and provide the plied sheet thus formed with a hard mar-resistant surface. The resin employed in carrying out the present invention is preferably of the so called "contact pressure" type that requires the application of heat to set or cure the same, and in order to produce a resin treated sheet that is uniform as to weight and thickness it is highly important that uniform pressure and tension be exerted on the sheet while it is being cured.

The primary purpose of the present invention is to provide a simple and practical method and apparatus whereby a resin impregnated fibrous sheet may be cured as a continuous operation by advancing the resin impregnated sheet along a predetermined path, and by maintaining a low uniform pressure upon a large area of such sheet while it is being cured so that a sheet that is uniform as to weight and thickness can be produced.

Resin impregnated sheets have been treated heretofore with the so called "high pressure" resins by placing them in a heated platen and closing the platen so as to hold the resin treated sheet clamped between the platen heads under high pressure during the curing period, but this constitutes an intermittent step by step method of cure that is slow and expensive. Furthermore unless the active faces of the platen heads are ground accurately to a true plane the resin treated sheet cured in such platen will not be uniform as to thickness, and even if the platen heads are accurately ground they are likely to warp in use so that they will not continue to turn out a sheet that is uniform as to thickness.

It has also been proposed heretofore to cure fibrous sheets treated with the so called "contact pressure" type resin and then advance the resin treated sheet through a heated tunnel while confining it between two sheets of cellophane which are held in a stretched condition by tentering mechanism, but this does not give an accurate control of the tension upon the cellophane sheets.

The present invention contemplates a construction whereby a resin treated sheet may be cured as a continuous operation by advancing it over the convex surface of an arcuate heated platen, and by providing a flexible pressure sheet stretched over the curved resin impregnated sheet to maintain uniform pressure upon this sheet over a large area throughout the curing period. In some cases the upper cover sheet or pressure sheet may be omitted, in which case the arcuate supporting surface performs the function of keeping the impregnated sheet stretched uniformly with uniform pressure at its lower face.

The method and apparatus of the present invention may be employed to treat various types of resin impregnated sheets, such for example, as a single sheet of paper or woven fabric treated with such resin to impart to the same increased stiffness, toughness and a hard, durable, mar-resistant surface, or the present invention may be employed to treat simultaneously two or more such sheets to form a laminated sheet. The present invention may also be employed to produce a composite sheet formed of different layers. For example it may be employed to provide a laminated sheet in which the main or body portion of the sheet is formed of layers of paper or fabric, and to which body portion is secured an ornamental or decorated sheet of paper, veneer, metal foil or the like. The impregnating resin used may be dyed to impart any desired color to the finished sheet, or the resin may have any one of a number of pigments added thereto to color the resin, increase its body or impart other properties thereto.

One important use of the present invention is to provide strong, durable, translucent sheet material that is well adapted for use to form shatter resistant flexible diffusers of light. This may be done by treating a single sheet of woven glass fibre or a plurality of such sheets with a clear resin to provide a semi-transparent sheet of great toughness and durability and which can be formed or bent upon the application of heat, to produce light shades and reflectors of the desired shape.

Another important application of the present invention is to turn out resin treated sheet material that is well adapted for use as table tops, bar tops and wall boards, in which case the exposed face of such resin treated sheet may be ornamented by covering the body portion of a laminated sheet with a sheet of decorated wall paper or printed fabric or wooden veneer, in which case the color of the underlying ornamental sheet will show clearly through the film of transparent resin covering the same. The resin will provide a hard, water-proof, mar-resistant surface adapted to protect the underlying ornamental sheet. It also imparts remarkable dimensional stability to the sheet.

In most cases it is important that the resin impregnated sheet produced in accordance with the present invention be provided with a hard smooth outer surface which is free from minute pits, holes or cracks in which dirt might lodge to mar the appearance or usefulness of the finished sheet. In curing resin impregnated sheets heretofore in a platen press as above described it has been difficult to form smooth surfaces which were free from pits and other defects, due to the fact that the large metal platen heads interfered with the escape of the gases thrown off by the resin during the curing period and entrapped in the impregnated sheet, with the result that these gases would produce pits, bubbles or other defects in the surface of the finished sheets. The construction of the present invention has greatly reduced this difficulty by employing only one platen member having a flexible cover sheet associated therewith, since the gases produced during the curing operation have a chance to escape through the cover sheet without marring the surface of the resin.

The gases thrown off in curing a resin which impregnates the fibrous sheet are, when a contact pressure type of resin is used, air trapped in the fibrous sheet and a small volatilized portion of the fibrous sheet and a small volatilized portion of the polymerizable solvent, generally styrene, which is used as a co-monomer in the liquid resin. This volatilized styrene is not formed by a chemical reaction but is merely coincidentally volatilized in the curing process.

The above and other features of the method of the present invention and apparatus for carrying out such method will be further understood from the following description when read in connection with the accompanying drawings, wherein:

Fig. 1 is a side elevation with parts in section of apparatus for supporting a plurality of rolls of fibrous sheets so that these sheets may be advanced to a resin bath.

Fig. 2 is a side elevation with parts in section of apparatus for heat treating the sheets of Fig. 1 after they are impregnated with the resin, Fig. 2 being a continuation of the apparatus of Fig. 1.

Fig. 3 on an enlarged scale is a sectional view through the resin treated multiply sheet produced on the apparatus of Figs. 1 and 2; and Fig. 4 is a transverse sectional view of Fig. 2 taken through the hollow platen and sheets traveling thereover.

The apparatus of the present invention, as above mentioned, may be employed to treat a single sheet with resin or to provide a multiply sheet formed of two or more resin impregnated sheets that are bonded together by the resin. Actually the present apparatus has been used very satisfactorily to impregnate a single sheet of fibrous material and then cure the resin upon this sheet so that the finished treated sheet was only .005 of an inch thick. In the construction shown the apparatus illustrated is used to provide a four ply resin impregnated sheet. These four sheets are designated on the drawing by numerals 10, 11, 12 and 13 each of which may be formed of paper, cloth, woven glass fiber or other fibrous material.

The apparatus shown in the drawing is set up to produce a multiply sheet which is well adapted for use as a durable table top or bar top, and for this purpose the lower sheets 10 and 11 are formed of paper such for example as kraft paper, the third sheet from the bottom designated by 12 is a decorated sheet of paper such for example as a highly colored wall paper, then over the decorated sheet 12 is placed a thin translucent sheet of paper 13. The purpose of this translucent sheet 13 is to give greater supported thickness of the resin film covering the sheet 12 for more wear before impairment of the underlying design.

These four sheets of paper are supplied from the supply rolls numbered 14, 15, 16 and 17 respectively. If these rolls have absorbed much moisture the paper should be dried before the resin is applied. Each of these paper rolls is mounted on a central supporting shaft 18 which is adapted to be rotatably supported by the U-shaped brackets 19. It is important that each paper supply roll be accurately aligned with respect to the axis of the other paper rolls and also to the length of the platen curing apparatus to be described, for unless these rolls are properly aligned the sheets of paper travelling therefrom will run crooked and give trouble. In order to provide for an accurate alignment of these rolls, each U-shaped bracket 19 is secured at the outer end of a supporting arm 20 which is mounted for longitudinal adjustment and for lateral adjustment. To this end each arm 20 is mounted in a box-like housing 21 having an opening therein considerably larger than the width of the arm 20 so that the arm may slide longitudinally therein and be clamped in the desired position of longitudinal adjustment or shifted laterally therein and clamped in the desired position of lateral adjustment. In order to adjust an arm 20 longitudinally each housing 21 is provided with a laterally extending flange 22 having a hole therethrough through which extends the threaded end portion 23 of the arm 20, and this threaded end portion is clamped in the desired position of longitudinal adjustment by tightening the clamping nuts 24. The arm 20 is rocked in an upward or downward direction by adjusting the threaded bolt 25 that extend laterally from the side walls of the box 21, and the inner ends of which bolts engage the arm 20.

The bracket supporting boxes 21 are rigidly secured to the supporting frame having the upwardly extending beams 26 and 27 connected by the horizontally extending bars 28, and between the roll supporting frame thus formed and a tank 29 in which the resin 30 is confined, are provided the uprights 31 adapted to support rollers 32 over which the sheets of paper pass on their way to the resin impregnating bath. It is desirable to provide means for taking up the slack which may occur in any one of the sheets 10 to 13 inclusive and therefore, in the construction shown, each sheet has mounted near its supporting roll 32 a floating bar 33 the opposite ends of which are constructed to slide up and down in the vertical slots 34.

It is desirable to maintain the sheets 10 to 13 inclusive in spaced relationship to each other until after they have dipped downwardly into the bath of resin 30, therefore, guide bars 35 are provided above the resin tank 29 to hold the sheets 10 to 13 inclusive apart as they pass downwardly to a roller 36 submerged in the resin bath 30. This gives each sheet of paper an opportunity to become impregnated with the resin. These sheets of paper, in the construction shown, are brought together as they pass about the submerged roller 36. For more speed the sheets 10 to 13 may be kept in spaced relation until just before emerging from the far end of the dip tank. Exposing both sides of each sheet for this distance permits the proper degree of impregnation in a shorter time, and so the speed of the machine may be increased. The sheets then advance to a second submerged roller 37 and upwardly out of the tank and over a scrapper bar 38 adapted to scrap the excess resin from the lower surface of the ply sheet. The excess resin upon the upper face of the ply sheet may be removed by the upper scrapper bar 39 which may be adjusted in a vertical direction by the adjusting screws 40. The resin containing tank 29 and associated parts are supported by a frame having the uprights 41 connected by the horizontal bars 42.

The dot and dash line A—A in Fig. 1 and similar line A—A in Fig. 2 indicates the point at which the two views, Figs. 1 and 2, are joined together to make one continuous machine. The ply sheet formed of the sheets of paper numbered 10 to 13 inclusive is designated by S and this resin impregnated ply sheet passes from the scrapper bars 38 and 39 of Fig. 1 to the rubber squeeze rolls 43 and 44 of Fig. 2. These squeeze rolls are rotatably supported by the uprights 45 and the upper roll may be adjusted towards and from the lower roll by rotating the threaded adjusting screws 46. These squeeze rolls may squeeze out of the sheet S excess resin which may run down the curved surface of the lower roll 43 into the catch through 47.

The resin 30 applied to the sheet S is of a type that requires to be heated for a substantial length of time to cause the same to set or cure, and the heating of the resin bearing sheet S to effect such cure is carried out in accordance with the present invention, by causing this sheet to slide over the upper convex surface of a heated arcuate platen of substantial length and width so that it will accommodate a relatively wide sheet, and supply the curing heat during the period required for the resin impregnated sheet S to travel a substantial distance.

The resin 30 used in the tank 29 is preferably a copolymerizable liquid monomer of low volatility which will solidify into a hard thermosetting material without giving off any reaction by-products, and in this respect differs substantially from the well known condensation resins such as phenol and urea formaldehydes, melamines and etc. which, as is well understood sets with the evolution of condensation products typified by water and ammonia. The copolymerizable resins which it is preferred to use are syrupy liquids which under proper conditions readily impregnate the fabric or paper and cure or harden in situ under contact pressure to a hard, glassy substance. The polymerization reaction of these resins takes place with the evolution of exothermic heat, which must be controlled so as to prevent the resin from overheating and "boiling" to form bubbles or blisters in the finished resin surface. Therefore the arcuate heated platen that is employed to cure the resin treated sheet is preferably formed in three or more independent sections that are spaced slightly from each other. Three of these sections are shown in the drawing, and are designated by the numerals 48, 49 and 50. These arcuate sections may be heated electrically but are preferably heated by steam or hot water. Therefore each of these sections is made hollow as indicated by 51 in Figs. 2 and 4, and in the construction shown each section is supplied with steam by means of the horizontal pipe 52 which is connected to the different sections by the upright pipes 53, and each upright pipe 53 is provided with a valve 54 for controlling the flow of steam to a chamber 51. If desired the first curved platen 48 and third curved platen 50 may be heated with steam while the intermediate platen 49 is supplied with water that may be employed to carry off the exothermic heat produced as the resin begins to polymerize. The use of the curved curing platen shown in the drawings provides a further advantage in that the exothermic heat can readily escape upwardly from the sheet S through the thin covering sheet to be described.

The resin treated sheet S upon leaving the squeeze rolls 43, 44 travels with a sliding movement over the upper convex surface of the arcuate platen, and since the platen is formed of several curved sections with a slight space between the sections to reduce the transmission of heat from one to the other, it may be desirable to cover the entire curved upper face of the arcuate platen with a thin continuous metal sheet 55 having a highly polished upper face over which the travelling sheets may slide freely.

It is important to prevent the resin carried by the sheet S from being deposited on the metal sheet 55 and form a friction producing film over its highly finished upper face. It is therefore desirable to apply to the lower face of the travelling sheet S as it approaches the arcuate platen a base sheet 56 such as a sheet of kraft paper having a glossy surface that will not adhere unduly to the resin being cured, or the sheet 56 may be a cellophane sheet. This sheet 56 is supplied by the roll 57 rotatably supported by the uprights 58, and this roll 57 has associated therewith a brake band 59 adapted to be adjusted to supply the desired amount of tension upon the sheet 56 as it travels from the supply roll 57 around the lower squeeze roll 53 and then lengthwise of the platen, to prevent the lower face of the sheet S from coming into direct contact with the curved metal sheet 55.

It is also desirable to provide the upper surface of the sheet S with a covering sheet 60 as the sheet S passes over the curved platen. This sheet 60 may be made of the same material as 56 or of a different material and is supplied by the roll 61 supported by brackets 62 carried by the uprights 45. This roll 61 has associated therewith a brake band 63 to retard its rotation. The cover sheet 60 passes from the let-off roll 61 around the upper squeeze roll 44 and then over the arcuate platen in contact with the upper face of the sheet S.

These cover sheets 56 and 60 serve several important purposes. They exclude air from the resin covered faces of the sheet S during the curing period, which is desirable in many cases, since the resin used may cure better when it is not exposed to the air. Also the upper sheet 60 and lower sheet 56 exerts an embossing action upon the faces of sheet S to impart to the cured resin the imprints of the faces of these covering sheets. For example if it is desired to impart to the sheet S a very smooth surface then the face of the cover sheet resting there against should be very smooth, but if a slightly rough finished surface is desired then a paper covering sheet having this rough finish should be employed to emboss its imprint upon the resin surface of the sheet S.

The upper covering sheet 60 performs still another and very important purpose in that it serves as a taut pressure sheet that presses the resin impregnated sheet S uniformly against the platen throughout the curing period. The tension of this sheet 60 may be controlled by tightening or slacking off the brake 63 acting upon the let off roll 61. This covering sheet 60 not only serves to exert uniform pressure upon the sheet S throughout its curing period but permits the small amount of gas which may be produced during the cure to pass through its body. It also permits the excess exothermic heat to escape upwardly, and keeps the squeeze roll clean and prevents the drive roll from acting on the tender surface of the sheet S. If the lower face of the sheet S is to be the exposed finished face, then the upper cover sheet 60 may be less important, since the tension exerted on the sheets 11 and 12 will produce the desired uniform pressure on the lower face of the sheet S during the cure.

The sheet 60 may be eliminated when the resin employed is one which will cure in air. The exposed resin surface will be slightly rough after cure rather than a reflection of the surface of the cover sheet. The finished side in this case is adjacent to the platen and the tension on the filler sheets 10, 11, 12, 13 provide sufficient pressure to bond the plies securely together.

The paper sheets 10 to 13 inclusive and the covering sheets 56 and 60 may be drawn forward from their supply rolls by employing the power driven, rubber squeeze rolls 64, 65 which are rotatably supported by the upright frame 66 disposed at the discharge end of the curved platen. The upper roll 65 may be adjusted in a vertical direction by rotating the adjusting screws 67. The lower roll 64 is power driven at the desired speed by the sprocket chain 68 which is driven from the electric motor 69 by means of reducing gears enclosed within the housing 70. When the cured sheet S passes out from between the nip of the squeeze rolls 64, 65 it is finished and the covering sheets 56 and 60 are stripped therefrom, or the top sheet may be left on to protect the resin surface. The lower sheet 56 passes downwardly about the roller 64 and is wound up on the roll 71 which rests upon the power driven roller 72. The upper sheet 60 passes upwardly about a curved portion of the roll 65 and is wound up on the roll 73 which rests upon the driven roller 74. The finished sheet S upon leaving the rolls 64, 65 may pass onto a supporting table 75 where it may be cut into sheets of the desired length. Or if desired it may be cooled and then wound into a roll ready for the market.

The resins 30 used, which are sometimes called "contact resins," may be described generally as unsaturated polyesters. Chemically they are formed from alkyds (unsaturated polyhydric alcohol plus unsaturated polybasic acid) and a liquid monomer solvent such as styrene, vinyl acetate or methyl methacrylate which will itself polymerize. Upon the application of heat in the presence of a catalyst these constituents polymerize to form cross-linked, three-dimensional structures. Diethylene glycol maleate in styrene is a typical example. These resins are further described in British Patent 540,167 and U. S. Patent 2,195,362.

Another group of polyester resins of the contact type are classified as allyl resins. These are also applicable for purposes of this application. One commonly used resin of this group is diethylene glycol bis allyl carbonate. Details on the preparation and physical characteristics of these materials may be found in U. S. Patent 2,384,123 (especially Example 1) and 2,384,125 (especially Examples 1, 2 and 3).

The temperatures used in effecting the polymerization or cure of the resin carried by the sheet S may vary considerably depending upon the thickness of the sheet and speed of its travel. In curing the four ply sheet described and shown in the drawing it is found desirable to maintain the first arcuate section 48 at a temperature of approximately 225° F., the second arcuate section 49 at a temperature of approximately 200° F. and the third section 50 at a temperature of 240° F., and it is found desirable to advance the sheet S over the arcuate platen at the rate of a few feet per minute say somewhere between 5 and 10 feet per minute.

In order to conserve heat or remove fumes it may be desirable to provide a curved hood 76 over the arcuate platen. This hood is supported when the machine is in operation in slightly spaced relation to the cover sheet 60 as shown, and it may be provided at its opposite side edges with the downwardly extending flanges 77 which help to confine the rising hot air. The hood may be supported in the operating position in which it is shown by the inclined posts 78 and pins 79 projecting through these posts, and the hood when not in use may be supported in an elevated position out of the way by pins extending through holes 80 provided near the upper ends of the posts 78. The entire arcuate platen is supported at the desired distance from the floor by the uprights 81 and horizontal beams 82.

It may be desirable to heat the sheet S as it approaches the rolls 43 and 45 to decrease the viscosity of the resin 30 and cause it to flow more freely and thus more thoroughly impregnate the sheet. Such heat is conveniently supplied by the infrared lights 83 supported by the extensions 84 that are slidably mounted in a supporting beam so that the lights may be moved towards and from the sheet S to vary the amount of heat supplied thereto.

By employing an arcuate platen positioned as shown so that the sheet S travels in an upwardly inclined direction as it first contacts the platen, a highly desired result is secured, due to the fact that the hot viscous resin will flow by gravity down the sheet S in the opposite direction to which it is traveling to fill up any voids in the film covering this sheet. This helps to produce a finished resin treated sheet that is free from pits and other imperfections, such as excess surface resin.

The amount of resin that remains on the faces of the resin impregnated sheet at the time of cure should be carefully controlled, for if it is too thin the underlying fibrous sheet will not be covered, and if it is too thick the film will be brittle and tend to crack with age or flexing. The scraper blades, uniform pressure of the cover sheet, and gravity flow at the introductory end of the curved platen all contribute to the proper control of the thickness of the resin film. The thin translucent sheet 13 also helps to control the resin thickness over the design. Furthermore the combination of the curved heated platen and flexible covering sheet stretched thereover provides an extremely simple and practical means for maintaining uniform pressure and ironing action upon the resin impregnated sheet during the curing period.

Having thus described my invention, what I claim and desire to protect by Letters Patent is:

1. The method of producing by a continuous operation a resin impregnated sheet having a hard mar-resistant surface, which comprises impregnating a fibrous sheet with a completely polymerizable liquid unsaturated polyester resin, then sliding the resin treated sheet over the hot convex surface of a stationary arcuate platen with an ironing action and at such a rate that the resin will polymerize while traveling over such surface, and maintaining uniform pressure on said sheet radially to said surface by tensioning a covering sheet extending over the platen and resin impregnated sheet to thereby produce a cured sheet of highly uniform gage.

2. The method of producing by a continuous operation a resin impregnated laminated sheet having a hard mar-resistant surface, which comprises impregnating fibrous sheets with a completely polymerizable liquid unsaturated polyester resin, bringing these sheets together and sliding the laminated sheet they produce over the hot convex surface of a stationary arcuate platen with an ironing action and at such a rate that the resin will polymerize and bond the sheets together while traveling over such surface, and maintaining a uniform pressure on the laminated sheet radially to said surface by tensioning a covering sheet extending over the former sheet and platen to thereby produce a cured plysheet of highly uniform gage.

3. The method of producing by a continuous operation a resin impregnated laminated sheet having a protecting film of resin on its surface, which comprises treating fibrous sheets with a completely polymerizable non-by-product forming liquid contact resin, bringing the freshly treated sheets into contiguous relation and drawing them over the convex outer surface of a stationary, hot arcuated platen with an ironing action and at such a sliding rate that the resin will cure completely while traveling over such surface, and exerting longitudinal tension on the advancing ply sheet to hold it in intimate sliding relation with the curved platen surface to thereby produce a cured ply sheet of highly uniform gage.

4. The method of producing by a continuous operation a resin impregnated sheet having a hard mar-resistant surface, which comprises impregnating a fibrous sheet with a completely polymerizable non-by-product forming liquid contact resin, introducing this sheet between a base sheet and covering sheet and sliding all of said sheets together over the convex surface of a hot arcuate platen with an ironing action and at such a rate that the resin will polymerize while traveling over such surface, and maintaining uniform pressure of the resin treated sheet radially to said surface by tensioning said covering sheet over the platen to thereby produce a cured sheet of highly uniform gage.

5. The method of producing by a continuous operation a resin impregnated sheet of uniform thickness, which comprises impregnating a fibrous sheet with a completely polymerizable non-by-product forming liquid contact resin, then sliding the resin treated sheet with an ironing action over the convex surface of a heated arcuate platen which is so supported that the sheet will travel in an upwardly inclined direction upon first engaging the platen so that the excess resin will flow by gravity in a reverse direction to that of the sheet travel, and tensioning said sheet to retain it in firm sliding engagement with the arcuate platen to thereby produce a cured sheet of highly uniform gage.

6. The method of producing by a continuous operation a resin impregnated sheet that is highly uniform as to weight and thickness, which comprises impregnating a fibrous sheet with a completely polymerizable non-by-product forming liquid resin, then sliding the resin treated sheet over the convex surface of a hot arcuate platen with an ironing action and at such a rate that the resin will set during this sliding movement, and maintaining uniform pressure upon such sheet while it sets by retaining a covering sheet in a stretched condition over the resin treated sheet and platen to thereby produce a cured sheet of highly uniform gage.

7. The method of producing by a continuous operation a resin impregnated sheet having a hard mar-resistant surface, which comprises impregnating a fibrous sheet with a completely polymerizable non-by-product forming liquid resin, then sliding the resin treated sheet over the hot convex surface of a stationary arcuate platen with an ironing action and at such a rate that the resin will polymerize while traveling over such surface, and maintaining uniform tension on said sheet to thereby hold it in firm sliding engagement with the arcuate platen to thereby produce a cured sheet of highly uniform gage.

8. Apparatus for heat treating an advancing resin-impregnated sheet to set the resin, comprising an arcuate platen formed of independently heated curved hollow sections that are heated by circulating fluid so that each section can be maintained at a different temperature, means for drawing a sheet that is impregnated with a non-by-product forming resin over the convex surface of the platen to heat treat the resin as the sheet slides over the platen with an ironing action, and means for maintaining uniform tension on said sheet to thereby retain it in firm sliding engagement with the arcuate platen.

STEPHEN V. LANDGRAF.

REFERENCES CITED

The following references are of record in the file of this patent:

UNITED STATES PATENTS

| Number | Name | Date |
| --- | --- | --- |
| 770,648 | Oeser | Sept. 20, 1904 |
| 2,208,060 | Wagner | July 16, 1940 |
| 2,219,065 | Bruker et al. | Oct. 22, 1940 |
| 2,345,013 | Soday | Mar. 28, 1944 |
| 2,376,922 | King | May 29, 1945 |
| 2,414,125 | Rheinfrank | Jan. 14, 1947 |
| 2,432,752 | Gray | Dec. 16, 1947 |
| 2,496,911 | Green | Feb. 7, 1950 |

FOREIGN PATENTS

| Number | Country | Date |
| --- | --- | --- |
| 380,520 | France | Oct. 10, 1907 |
| 674,252 | Germany | Apr. 11, 1939 |